H. CHRISTIANSEN.
SPRING SUSPENSION PIVOTAL ATTACHMENT FOR THE WHEELS OF MOTORCYCLE SIDE CARS.
APPLICATION FILED JULY 5, 1918.

1,364,715.

Patented Jan. 4, 1921.

Inventor
Hersleb Christiansen
BY
Attorneys

UNITED STATES PATENT OFFICE.

HERSLEB CHRISTIANSEN, OF COPENHAGEN, DENMARK.

SPRING-SUSPENSION PIVOTAL ATTACHMENT FOR THE WHEELS OF MOTORCYCLE SIDE CARS.

1,364,715.   Specification of Letters Patent.   Patented Jan. 4, 1921.

Application filed July 5, 1918. Serial No. 243,447.

*To all whom it may concern:*

Be it known that I, HERSLEB CHRISTIANSEN, automobile merchant, residing at No. 77 Raadhusplads, Copenhagen, Denmark, have invented certain new and useful Improvements in Improved Spring-Suspension Pivotal Attachments for the Wheels of Motorcycle Side Cars, of which the following is a specification.

My invention relates to a mounting for wheel or wheels, adapted for use with a side car of a motorcycle, although not necessarily restricted to this use.

An important object of the invention is to provide means of the above mentioned character whereby the wheel or wheels of the side car are free to turn in steering operation.

A further object of the invention is to provide a wheel mounting of the above mentioned character which is constructed to permit of the employment of suitable spring or springs in connection with the side car.

Figure 1:
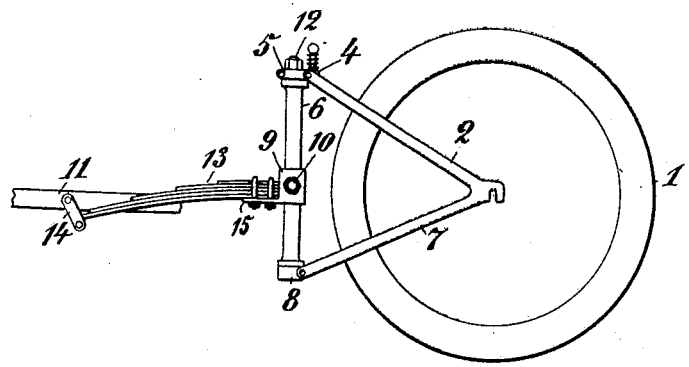
Figure 2:
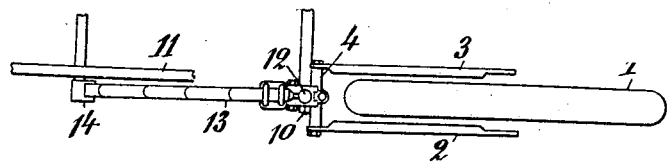
Figure 3:
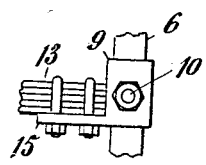
Figure 4:
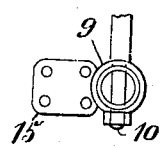

In the accompanying drawings forming a part of this specification and in which like numerals are employed to designate like parts throughout the same, Figure 1 is a side elevation of a device embodying my invention, Fig. 2 is a plan view of same, Fig. 3 is a side elevation of a coupling, and, Fig. 4 is a plan view of same.

In the drawings, wherein for the purpose of illustration is shown a preferred embodiment of my invention, the numeral 1 designates the wheel of a side car of a motorcycle, which wheel may be of any well known or preferred character. This wheel is pivoted within forked frames, including upper arms 2 and 3 and lower arms 7, which diverge forwardly, as shown. The upper arms 2 and 3 are connected with a transverse member 4, carried by a head 5. This head pivotally engages the top of an upright or vertical tube 6. The lower arms 7 are connected with a head 8, which pivotally contacts with the lower end of the tube 6. The tube 6 is suitably secured to the frame of the motorcycle while the forked frames are adapted to swing about the tube in a horizontal plane, the heads 5 and 8 being held in engagement with the tube 6 by a pivot element or rod 12, passing through the tube 6.

A coupling 9 receives the tube 6, and is arranged near its middle, this coupling being held against displacement by a rod or shaft 10, as shown.

The coupling 9 carries a flat plate or extension 15, to which is secured a leaf spring 13. The forward end of this leaf spring is secured to the attaching frame 11, in turn secured to the motorcycle.

In view of the foregoing description, it will be seen that the wheel 1 is free to turn in its steering operation, while the leaf spring 13 will take up the undue shocks or jars which would be otherwise transmitted to the side car.

It is to be understood that the form of my invention herewith shown and described is to be taken as a preferred example of the same, and the various changes in the shape, size, and arrangement of parts, may be resorted to, without departing from the spirit of my invention or the scope of the subjoined claims.

Having thus described my invention, I claim:

1. A device of the character described comprising, a wheel, forked frames arranged upon opposite sides of the wheel and having pivotal connection therewith, each forked frame embodying forwardly diverging arms, a vertical tube arranged between the forward ends of the upper and lower arms, heads connected with said arms and pivotally engaging the ends of the tube, a coupling secured to the tube between its ends, a leaf spring connected with the coupling, and means for securing the device to the frame of the motorcycle, said means having connection with the leaf spring.

2. A device of the character described, comprising, a wheel, forked frames arranged upon the opposite sides of the wheel and having pivotal connection therewith, each forked frame embodying forwardly diverging arms, a vertical tube arranged between the forward ends of the upper and lower arms, heads connected with said arms and pivotally engaging the ends of the tube, a rod extending through the tube and connecting the heads, a coupling secured to the tube between its ends, and resilient means to connect the coupling with the frame of the motorcycle.

In testimony whereof I affix my signature in presence of two witnesses.

HERSLEB CHRISTIANSEN.

Witnesses:
 CHARLES TENDE,
 EBBA HAIM.